United States Patent
Xue

(10) Patent No.: US 11,063,443 B2
(45) Date of Patent: Jul. 13, 2021

(54) TUNING CIRCUIT, TUNING METHOD AND RESONANCE-TYPE CONTACTLESS POWER SUPPLY

(71) Applicant: Silergy Semiconductor Technology (Hangzhou) LTD, Hangzhou (CN)

(72) Inventor: Xiaobo Xue, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 125 days.

(21) Appl. No.: 16/100,931

(22) Filed: Aug. 10, 2018

(65) Prior Publication Data

US 2018/0351371 A1 Dec. 6, 2018

Related U.S. Application Data

(63) Continuation of application No. 14/940,503, filed on Nov. 13, 2015, now Pat. No. 10,084,322.

(30) Foreign Application Priority Data

Nov. 13, 2014 (CN) .......................... 201410641345.5

(51) Int. Cl.
*H02J 50/12* (2016.01)
*H02J 5/00* (2016.01)

(52) U.S. Cl.
CPC .............. *H02J 5/005* (2013.01); *H02J 50/12* (2016.02)

(58) Field of Classification Search
CPC ................................... H02J 50/00; H04B 5/00
USPC .......................................................... 307/104
See application file for complete search history.

(56) References Cited

U.S. PATENT DOCUMENTS

| | | | | |
|---|---|---|---|---|
| 4,380,742 A | * | 4/1983 | Hart | H03L 7/085 331/1 A |
| 4,847,822 A | * | 7/1989 | Takasugi | G11B 7/0938 369/44.13 |
| 4,866,592 A | | 9/1989 | Fujii et al. | |
| 5,796,259 A | * | 8/1998 | Dickmander | G01R 31/08 324/108 |
| 7,710,084 B1 | * | 5/2010 | Guo | G01R 19/003 323/224 |
| 9,225,390 B2 | | 12/2015 | Li et al. | |
| 9,405,314 B1 | * | 8/2016 | Naviasky | G06F 1/12 |
| 2004/0005222 A1 | * | 1/2004 | Yoshida | F04B 35/045 417/44.11 |

(Continued)

FOREIGN PATENT DOCUMENTS

| | | |
|---|---|---|
| CN | 102299569 A | 12/2011 |
| CN | 102315698 A | 1/2012 |

(Continued)

*Primary Examiner* — Adi Amrany
(74) *Attorney, Agent, or Firm* — Michael C. Stephens, Jr.

(57) ABSTRACT

A resonance-type contactless power supply has the characteristic that an inductor current has a maximum value when it operates at a resonance frequency. Sampling values of the inductor current in two successive cycles are compared with each other. A frequency of an inverter circuit is adjusted in a manner the same as that in a previous cycle in a case that the inductor current increases, and is adjusted in a manner opposite to that in the previous cycle in a case that the inductor current decreases. Thus, the resonance-type contactless power supply can be properly tuned without the need for zero-crossing detection.

14 Claims, 7 Drawing Sheets

(56) References Cited

U.S. PATENT DOCUMENTS

| | | | |
|---|---|---|---|
| 2007/0205727 A1* | 9/2007 | Tamita | C01B 13/11 315/291 |
| 2014/0035364 A1 | 2/2014 | Uramoto et al. | |
| 2014/0043081 A1* | 2/2014 | Chen | H03K 5/13 327/283 |
| 2014/0285026 A1 | 9/2014 | Hori | |

FOREIGN PATENT DOCUMENTS

| | | |
|---|---|---|
| CN | 103580299 A | 2/2014 |
| CN | 203617791 U | 5/2014 |
| CN | 104009555 A | 8/2014 |
| CN | 104037956 A | 9/2014 |
| CN | 104065172 A | 9/2014 |
| CN | 104065179 A | 9/2014 |
| CN | 104079079 A | 10/2014 |
| CN | 104079081 A | 10/2014 |
| CN | 104135085 A | 11/2014 |

* cited by examiner

TUNING CIRCUIT, TUNING METHOD AND RESONANCE-TYPE CONTACTLESS POWER SUPPLY

CLAIM OF PRIORITY

This application is a continuation of the following application, U.S. patent application Ser. No. 14/940,503, filed on Nov. 13, 2015, and which is hereby incorporated by reference as if it is set forth in full in this specification, and which also claims priority to Chinese Application No. 201410641345.5, filed on Nov. 13, 2014 (published as CN 104333149 A), which is hereby incorporated by reference in its entirety.

BACKGROUND OF THE DISCLOSURE

Field of the Disclosure

The present disclosure generally relates to the field of power electronics, and more particularly, to a tuning circuit and a tuning method used in a resonance-type contactless power supply and a resonance-type contactless power supply.

Description of the Related Art

Contactless power supply is widely used in electronic products, especially in low-power electronic products such as cellular phones, MP3 players, digital cameras, laptop computers, and the like, due to their convenience and availability. A conventional contactless power supply usually comprises a transformer consisting of a transmitting coil $L1$ and a receiving coil $L_2$, and transfers energy from transmitting terminal to receiving terminal by coupling of magnetic field between primary and secondary coils of the transformer.

When electric energy is transferred, inductance values of the transmitting coil and the receiving coil may be changed by various factors such as external obstacles (for example a magnetic conductive object), a load of the power receiver, variations in an operating temperature of the circuit, and variations in locations of the coils. As a result, a resonance frequency of the resonance circuit is changed by variations in the inductance values of the transmitting coil and the receiving coil, and detuning occurs, which decreases significantly a transmission efficiency of the system.

The conventional resonance-type contactless power supply is tuned to a resonance frequency by zero-crossing detection of an inductor current in the transmitting coil. However, such a tuning method needs a zero-crossing detecting circuit with a high precision, because small delay in the zero-crossing detecting circuit will greatly influence the circuit, especially when the resonance frequency is high.

BRIEF DESCRIPTION OF THE DISCLOSURE

In view of this, the present disclosure provides a tuning circuit, a tuning method and a resonance-type contactless power supply, without the need for zero-crossing detection of an inductor current for tuning the resonance-type contactless power supply, which reduces circuit cost and improves tuning precision.

According to a first aspect, there is provided a tuning circuit for tuning a resonance-type contactless power supply, comprising:

a sampling circuit configured to obtain a sampling value of an inductor current from a resonance-type contactless power supply in each cycle, and to provide a first sampling signal and a second sampling signal, wherein the first sampling signal represents a sampling value in a current cycle, and the second sampling signal represents a sampling value in a previous cycle;

an adjustment instruction circuit configured to generate an adjustment signal the same as that in the previous cycle in a case that the first sampling signal is larger than the second sampling signal, or opposite to that in the previous cycle in a case that the first sampling signal is less than the second sampling signal;

a control signal adjusting circuit configured to regulate a frequency of a control signal of an inverter circuit in accordance with the adjustment signal, wherein the adjustment signal instructs the frequency of the control signal to increase or decrease by a predetermined amount.

Preferably, the adjustment instruction circuit comprises:

a first comparator configured to compare the first sampling signal with the second sampling signal, and to provide a first instruction signal;

a second comparator configured to compare the second sampling signal with the first sampling signal, and to provide a second instruction signal;

a register configured to feed back the adjustment signal of the previous cycle to an adjustment logic circuit; and an adjustment logic circuit configured to provide an adjustment signal the same as that in the previous cycle in a case that the first instruction signal and the second instruction signal indicate that the first sampling signal is larger than the second one, or opposite to that in the previous cycle in a case that the first instruction signal and the second instruction signal indicate that the first sampling signal is less than the second sampling signal.

Preferably, the adjustment instruction circuit further comprises:

a first voltage source being electrically coupled to a non-inverting input terminal of the first comparator, and configured to compensate an offset voltage of the first comparator; and a second voltage source being electrically coupled to the non-inverting input terminal of the second comparator, and configured to compensate an offset voltage of the second comparator.

Preferably, the tuning circuit further comprises:

a follower logic circuit configured to provide a follower signal which is valid in a case that the first instruction signal is inconsistent with the second instruction signal and the sampling value is less than a predefined threshold; and a follower control circuit being electrically coupled between the adjustment instruction circuit and the control signal adjusting circuit, and configured to provide a predefined adjustment signal or an adjustment signal the same as that in the previous cycle when the follower signal is valid, and to provide an adjustment signal of the current cycle when the follower signal is not valid.

Preferably, the sampling circuit further comprises:

a sampling and filtering circuit configured to obtain the sampling value of the inductor current from the resonance-type contactless power supply in each cycle;

a first capacitor being electrically coupled between a first output terminal and a reference terminal;

a second capacitor being electrically coupled between a second output terminal and the reference terminal;

a first switch being electrically coupled between an output terminal of the sampling value and the first output terminal; and a second switch being electrically coupled between the first output terminal and the second output terminal, wherein the first switch and the second switch is turned on and off alternatively.

Preferably, the control signal adjusting circuit comprises:

an up-down counter configured to count up or down a counter value in accordance with the adjustment signal;

a digital-to-analog converter configured to convert the counter value to a corresponding analog signal;

a voltage controlled oscillator configured to provide a frequency signal corresponding to the analog signal; and an inverter control circuit configured to generate a control signal of the inverter circuit in accordance with the frequency signal.

According to a second aspect, there is provided a resonance-type contactless power supply, comprising:

the tuning circuit according to the first aspect;

an inverter circuit configured to provide a high-frequency AC current in accordance with the control signal provided by the tuning circuit, wherein the high-frequency AC current has a frequency corresponding to the control signal;

a transmitter-side resonant circuit comprising a transmitting coil and configured to receive the high-frequency AC current from a high-frequency AC power supply; and a receiver-side resonant circuit comprising a receiving coil which is separated from but coupled to the transmitting coil in a contactless manner, and configured to receive electric energy from the transmitting coil.

According to a third aspect, there is provided a tuning method for tuning a resonance-type contactless power supply, comprising:

obtaining a sampling value of an inductor current from a resonance-type contactless power supply in each cycle, and providing a first sampling signal and a second sampling signal, wherein the first sampling signal represents a sampling value in a current cycle, and the second sampling signal represents a sampling value in a previous cycle;

generating an adjustment signal the same as that in the previous cycle in a case that the first sampling signal is larger than the second sampling signal, or opposite to that in the previous cycle in a case that the first sampling signal is less than the second sampling signal; and regulating a frequency of a control signal of an inverter circuit in accordance with the adjustment signal;

wherein the adjustment signal instructs the frequency of the control signal to increase or decrease by a predetermined amount.

Preferably, the first sampling signal is compared with the second sampling signal by a first comparator to provide a first instruction signal and the second sampling signal is compared with the first sampling signal by a second comparator to provide a second instruction signal, to determine whether the first sampling signal is larger than the second sampling signal accordance with the first instruction signal and the second instruction signal.

Preferably, a first voltage source and a second voltage source provided to compensate offset voltages the first comparator and the second comparator respectively.

Preferably, the method further comprising:

providing a predetermined adjustment signal or an adjustment signal the same as that in the previous cycle in a case that the first instruction signal is inconsistent with the second instruction signal and the sampling value is less than a predefined threshold, and providing an adjustment signal in the current cycle in a case that the first instruction signal is consistent with the second instruction signal or the sampling value is not less than the predefined threshold.

The resonance-type contactless power supply has the characteristic that an inductor current reaches a peak value when it operates at a resonance frequency. Sampling values of the inductor current in two successive cycles are compared with each other. A frequency of an inverter circuit is adjusted in a manner the same as that in a previous cycle in a case that the inductor current increases, and is adjusted in a manner opposite to that in the previous cycle in a case that the inductor current decreases. Thus, the resonance-type contactless power supply can be properly tuned without the need for zero-crossing detection.

BRIEF DESCRIPTION OF THE DRAWINGS

The above and other objects, advantages and features of the present disclosure will become more fully understood from the detailed description given herein below in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present disclosure is not limited to these embodiments. Furthermore, in the following detailed description of the present disclosure, numerous specific details are set forth in order to provide a thorough understanding of the present disclosure. However, it will be readily apparent to one skilled in the art that the present disclosure may be practiced without these specific details. In other instances, well-known methods, procedures, processes, components, and circuits have not been described in detail so as not to unnecessarily obscure aspects of the present disclosure.

Furthermore, it will be understood by one skilled in the art that attached drawings are to be regard as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
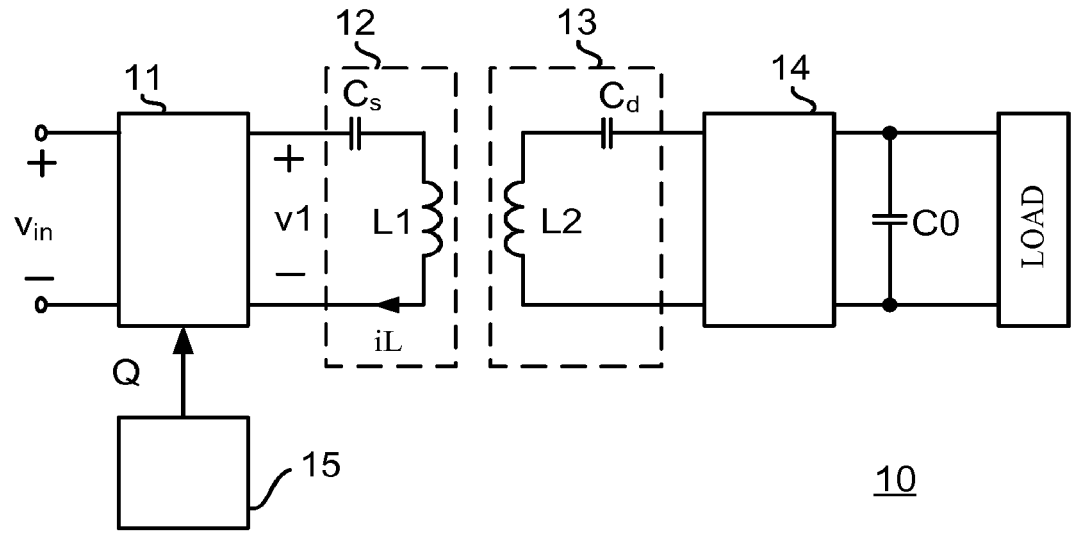
FIG. 1 is a schematic circuit diagram of an example resonance-type contactless power supply according to one embodiment of the present disclosure.

FIG. 1 is a schematic circuit diagram of an example resonance-type contactless power supply according to one embodiment of the present disclosure. As shown in FIG. 1, a resonance-type contactless power supply 10 includes an inverter circuit 11, a transmitter-side resonant circuit 12, a receiver-side resonant circuit 13, a rectifier circuit 14, an output capacitor C0 and a tuning circuit 15.

In this embodiment, the inverter circuit 11, the transmitting-side resonant circuit 12 and the tuning circuit 15 constitute a power transmitter in the resonance-type contacticss power supply 10. The receiver-side resonant circuit 13, the rectifier circuit 14 and the output capacitor C0 constitute a power receiver in the resonance-type contactless power supply 10.

The power transmitter and the power receiver are separated from but electrically coupled to each other by the transmitter-side resonant circuit 12 and the receiver-side resonant circuit 13 to transfer electric energy.

The tuning circuit 15 provides a control signal Q for controlling the inverter circuit 11 to output a high-frequency AC current V1.

The inverter circuit 11 provides a high-frequency AC current in accordance with the control signal Q from the tuning circuit 15, the frequency of which is controlled by the control signal Q.

The control signal Q may be a one-channel signal or a multi-channel signal. The inverter circuit 11 may be a full-bridge inverter circuit, a half-bridge inverter circuit, or any other inverter circuit having similar functions.

The transmitter-side resonant circuit 12 includes a transmitting coil L1 which receives a high-frequency AC current v1 from the inverter circuit 11. The transmitter-side resonant circuit 12 needs an additional transmitter-side resonance capacitor $C_s$ which is connected in series or in parallel with the transmitting coil L1 to provide a resonance circuit. The transmitter-side resonance capacitor $C_s$ is used for balancing leakage inductance of the transmitter-side resonant circuit 12, reflected inductance of the receiver-side resonant circuit 13 and parasitic inductance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonance capacitor so that an additional capacitor can be omitted in the circuit.

The receiver-side resonant circuit 13 includes a receiving coil $L_2$. The receiving coil L2 is electrically coupled to the transmitting coil L1 in the transmitter-side resonant circuit 12 in a detachable and contactless manner. The receiver-side resonant circuit 13 receives electric energy from the transmitting coil L1.

Meanwhile, the receiver-side resonant circuit 13 needs an additional receiver-side resonant capacitor $C_d$ for decreasing reactive power at a receiver side and increasing active power transferred by the resonance and magnetic coupling circuit. As mentioned above, distributed capacitance (for example, among wires of the coil) of other components in the circuit may be used as the receiver-side resonant capacitor $C_d$ so that an additional capacitor can be omitted in the circuit.

The transmitter-side resonant circuit 12 and the receiver-side resonant circuit 13 constitute the resonance and magnetic coupling circuit.

Figure 2:
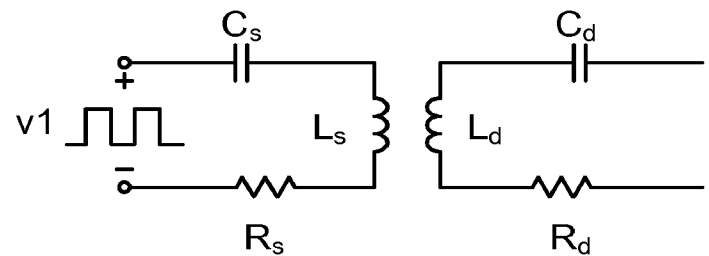
FIG. 2 is an equivalent circuit diagram of a resonance and magnetic coupling circuit in the example resonance-type contactless power supply according to one embodiment of the present disclosure.

FIG. 2 is an equivalent circuit diagram of a resonance and magnetic coupling circuit, i.e. a combination of a transmitter-side resonant circuit 12 and a receiver-side resonant circuit 13, in the example resonance-type contactless power supply according to one embodiment of the present disclosure.

As shown in FIG. 2, the transmitting coil L1 is equivalent to a first ideal coil $L_s$ and a coil resistor $R_s$, and the receiving coil $L_2$ is equivalent to a second ideal coil $L_d$ and a coil resistor Rd. The first ideal coil $L_s$ is coupled to the second ideal coil $L_d$. In FIG. 2, the transmitter-side resonant circuit 12 and the receiver-side resonant circuit 13 are each series resonance circuits. The transmitter-side resonant circuit 12 further includes a transmitter-side resonance capacitor $C_s$, and the receiver-side resonant circuit 121 further includes a receiver-side resonant capacitor $C_d$. As mentioned above, the transmitter-side resonance capacitor $C_s$ and the receiver-side resonant capacitor $C_d$ may be achieved by additional components or distributed parameters of other components.

Accordingly, the resonance and magnetic coupling circuit constitute a self-inductance coupling circuit.

Typically, the transmitter-side resonant circuit 12 and the receiver-side resonant circuit 13 have the same resonance frequency so that electric energy can be transferred in a resonant manner as follows, $$f_s = 1/2\pi \cdot \sqrt{L_s \cdot C_s} = 1/2\pi \sqrt{L_d \cdot C_d} = f_d$$

wherein $f_s$ is a resonance frequency of the transmitter-side resonant circuit 12, $f_d$ is a resonance frequency of the receiver-side resonant circuit 13, $L_s$ is an inductance value of the first ideal coil $L_s$, $L_d$ is an inductance value of the second ideal coil $L_d$, $C_s$ is a capacitance value of the transmitter-side resonance capacitor, and $C_d$ is a capacitance value of the receiver-side resonant capacitor.

Preferably, the inductance value of the first ideal coil $L_s$ may be set to be equal to the inductance value of the second ideal coil $L_d$, and the capacitance value $C_s$ of the transmitter-side resonance capacitor may be set to be equal to the capacitance value $C_d$ of the receiver-side resonant capacitor so that the receiver-side resonant capacitor 12 and the receiver-side resonant circuit 13 have the same resonance frequency.

Typically, the above resonance frequency is referred to as a self-inductance resonance frequency. When operating at the above resonance frequency, the transmitter-side resonant circuit 12 and the receiver-side resonant circuit 13 resonate simultaneously, and impendences of inductors and capacitors in the resonance and magnetic coupling circuit are canceled out. The system thus has a high efficiency.

Figure 3:
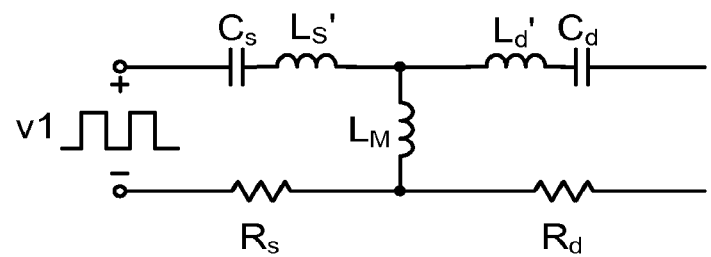
FIG. 3 is an equivalent circuit diagram of a resonance and magnetic coupling circuit in a decoupling state in the example resonance-type contactless power supply according to one embodiment of the present disclosure.

FIG. 3 is an equivalent circuit diagram of a resonance and magnetic coupling circuit in a decoupling state in the example resonance-type contactless power supply according to one embodiment of the present disclosure. As shown in FIG. 3, because the coupling of the transmitting coil L1 and the receiving coil L2 includes leakage inductance and mutual inductance, the resonance and magnetic coupling circuit as shown in FIG. 2 can be equivalent to the circuit as shown in FIG. 3, where the ideal coils $L_s$ and $L_d$ are coupled to each other but represented here by transmitter-side leakage inductance $L_s'$, receiver-side leakage inductance $L_d'$, and mutual inductance $L_M$. Accordingly, the resonance and magnetic coupling circuit as shown in FIG. 2 may be further equivalent to a two-port network as shown in FIG. 3.

Figure 4:
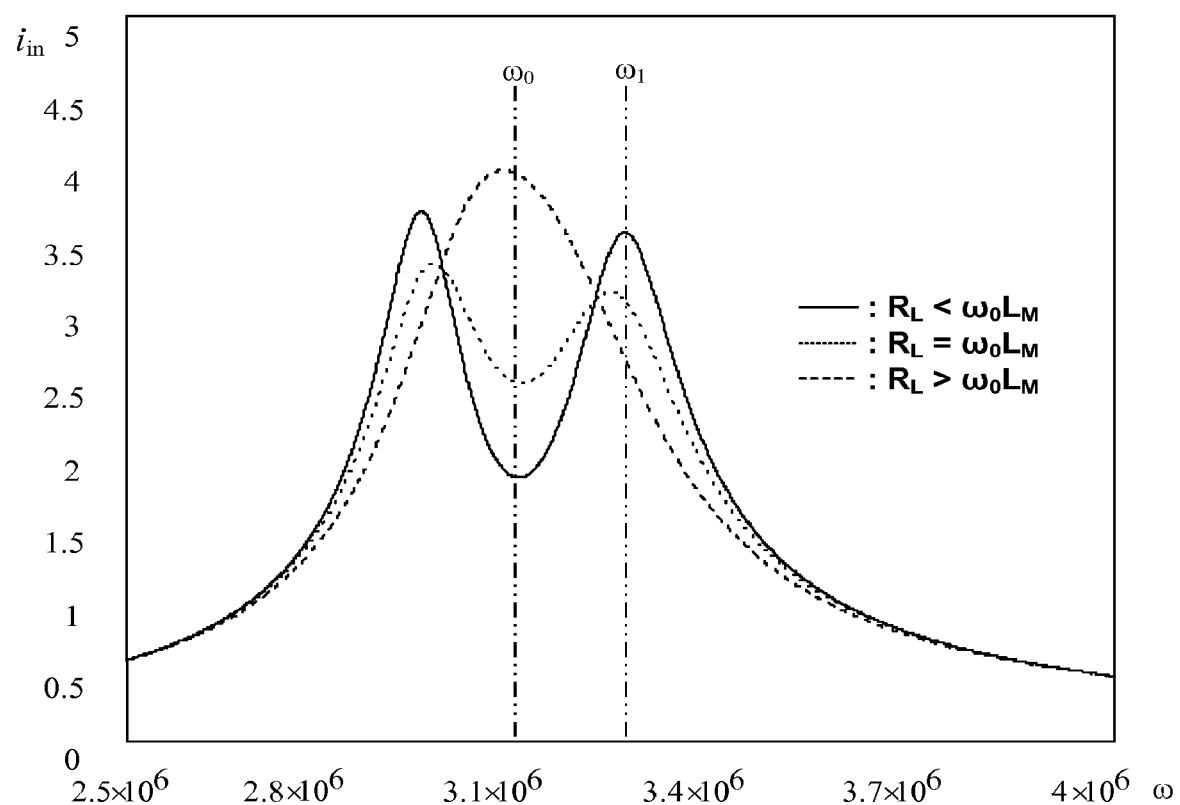
FIG. 4 shows a curve of variation of an inductor current with a frequency in the resonance and magnetic coupling circuit shown in FIG. 2.

FIG. 4 shows a curve of variation of an inductor current with a frequency in the resonance and magnetic coupling circuit as shown in FIG. 2. In this embodiment, self-inductance of the transmitting coil and the receiving coil are equivalent to leakage inductance and mutual inductance in a decoupling state so that impendences of leakage inductance and the resonance capacitance in the transmitter-side resonant circuit together with impendences of leakage inductance and the resonance capacitance in the receiver-side resonant circuit are canceled out in a specific resonance frequency. The resonance frequency is referred to as a leakage resonance frequency. When operating in the leakage resonance frequency, the system has a high efficiency.

As shown in FIG. 2, the coupling coefficient may change in response to variations of the relative location of the elements and the influence of the surrounding environment, which leads to variations of the transmitter-side leakage inductance $L_s'$, the receiver-side leakage inductance $L_d'$ and mutual inductance $L_M$, as shown in FIG. 3. If all of the circuit components in the power transmitter and receiver, except for the load, are known, the relationship between the load impendence $R_L$ and mutual inductance $L_M$, i.e. the coupling coefficient, is different. Accordingly the variation of the inductor current iL with the frequency of an input voltage v1, i.e. resonance characteristics, is also different.

When the load impendence $R_L<\omega_0 L_M$, in which $\omega_0$ is a resonance angular frequency of the transmitter-side resonant circuit, the resonance characteristic curve has double peaks, with a peak value at the leakage-inductance resonance frequency $\omega_1$ and a valley value at $\omega_0$. That is, the power transmitter has a maximum value of the inductor current when a high-frequency AC current with the leakage-inductance resonance frequency $\omega_1$ is fed into the resonance and magnetic coupling circuit, and has a minimum value of the inductor current when a high-frequency AC current with a self-inductance resonance frequency $\omega_0$ is fed into the resonance and magnetic coupling circuit.

If $L_s'C_s=L_d'C_d$, where $L_s'$ is the inductance value of leakage inductance of the power transmitter and equal to $L_S-L_M$, the leakage-inductance resonance frequency $\omega_1$ may be equal to $1/2\pi\cdot\sqrt{L_s\cdot C_s}$.

If the load impendence $R_L=\omega_0 L_M$, the resonance characteristic curve has double peaks, with a peak value at the leakage resonance frequency $\omega_1$ and a valley value at $\omega_0$.

If the load impendence $R_L>\omega_0 L_M$, the resonance characteristic curve has a single peak and the inductor current iL has a peak value at $\omega_0$.

To sum up, the circuit has a peak value of the inductor current in a resonant state when operating in the self-inductance resonant manner or in the leakage-inductance resonant manner.

Figure 5:
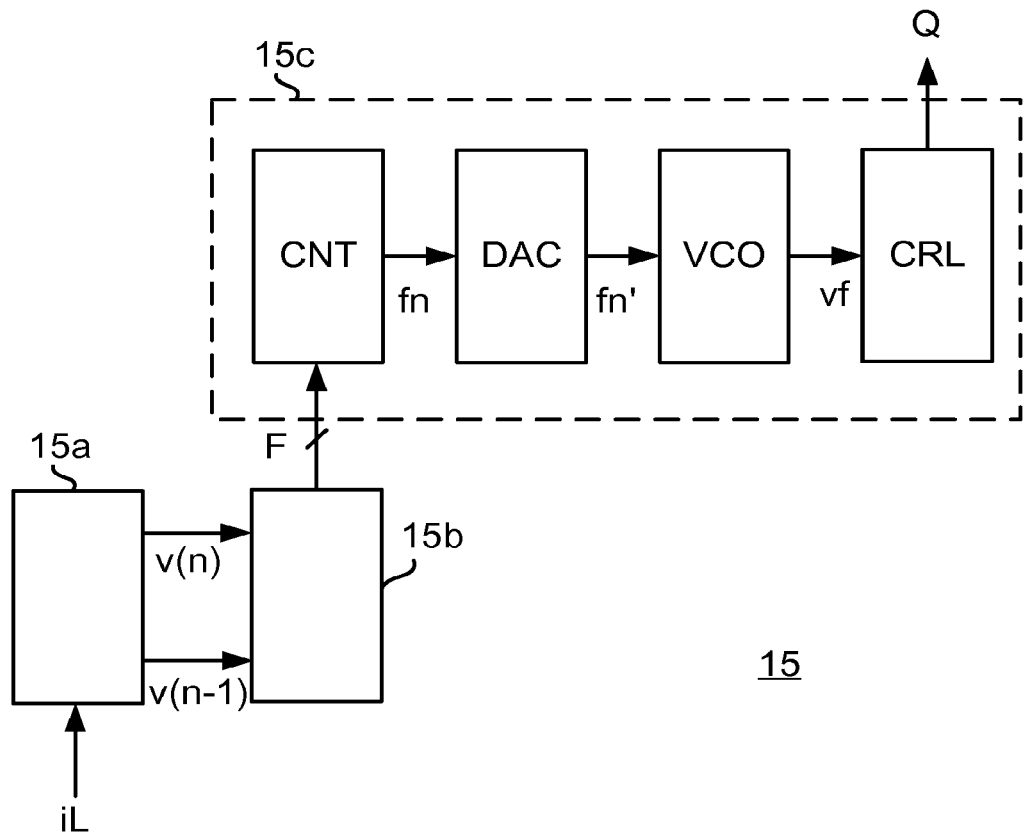
FIG. 5 is a schematic circuit diagram of a tuning circuit according to one embodiment of the present disclosure.

FIG. 5 is a schematic circuit diagram of a tuning circuit according to one embodiment of the present disclosure. As shown in FIG. 5, the tuning circuit 15 includes a sampling circuit 15a, an adjustment instruction circuit 15b and a control signal adjusting circuit 15c.

The sampling circuit 15a receives a sampling signal vs of the inductor current iL of the resonance-type contactless power supply 10 in each adjustment cycle, and provides a first sampling signal v(n) and a second sampling signal v(n−1). The first sampling signal v(n) represents a sampling value in a current adjustment cycle, i.e. the (n) th sampling cycle, and the second sampling signal v(n−1) represents a sampling value in a previous adjustment cycle, wherein n is a natural number.

The adjustment instruction circuit 15b generates an adjustment signal F the same as that in the previous adjustment cycle when the first sampling signal v(n) is larger than the second sampling signal v(n−1), or opposite to that in the previous adjustment cycle when the first sampling signal v(n) is less than the second sampling signal v(n−1). The adjustment signal F instructs the frequency of the control signal Q to increase or decrease by a predetermined amount.

The control signal adjusting circuit 15c adjusts the frequency of the control signal Q in the inverter circuit in response to the adjustment signal F.

In this embodiment, after the previous adjustment cycle, if the inductor current increases and indicates the previous adjustment is effective, the previous adjustment will continue so that the frequency of the control signal Q is more close to the resonance frequency. Thus, the adjustment instruction circuit 15b instructs the control signal adjusting circuit 15c to adjust the frequency in a manner the same as that in the previous cycle. If the inductor current decreases and indicates the previous adjustment is not effective, the frequency of the control signal Q will be adjusted to change in an opposite manner. Thus, the adjustment instruction circuit 15b instructs the control signal adjusting circuit 15c to adjust the frequency in a manner opposite to that in the previous cycle.

It is understood an initial frequency f0, an adjustment step and an initial adjustment signal F' may be set according to the circuit parameters and operation manner of the resonance-type contactless power supply 10.

For example, the initial frequency f0 is set to be a maximum value of the resonance frequency, and the initial adjustment signal F' is set to be the frequency of the control signal Q minus a predefined value. Thus, the tuning circuit will tune the resonance-type contactless power supply switch from a high frequency to a low frequency on the basis of initial parameters when it is powered on.

In another example, the initial frequency f0 is set to be a minimum value of the resonance frequency, the initial adjustment signal F' is set to be the frequency of the control signal Q plus a predefined value. Thus, the tuning circuit will tune the resonance-type contactless power supply switch from a low frequency to a high frequency on the basis of the initial parameters when it is powered on.

For the resonance-type contactless power supply operating in the self-inductance resonant manner, the initial frequency may be arbitrary because the inductor current has only a peak value in the whole frequency spectrum.

For the resonance-type contactless power supply operating in the leakage-inductance resonant manner, the frequency of the tuning circuit 15 should be limited to be close to one of the two leakage-inductance resonance frequencies, because the inductor current has two peak values in the whole frequency spectrum. That is, an upper limit and a lower limit of the tuning circuit 15 should not be above the valley value as shown in FIG. 4.

Meanwhile, the resonance-type contactless power supply operating in the leakage-inductance resonant manner cannot be tuned by zero-crossing detection, because the inductor current signal and the switching signal of the inverter circuit have a phase difference. However, there is no such limit in the tuning circuit according to this embodiment.

Figure 6:
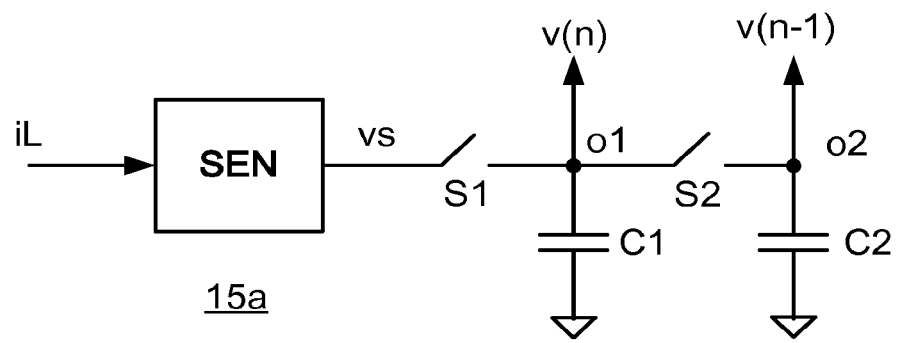
FIG. 6 is a schematic circuit diagram of a sampling circuit according to one preferable embodiment of the present disclosure.

FIG. 6 is a schematic circuit diagram of a sampling circuit according to one preferable embodiment of the present disclosure. As shown in FIG. 6, the sampling circuit 15*a* includes a sampling and filtering circuit SEN, a first capacitor C1, a second capacitor C2, a first switch S1 and a second switch S2.

The sampling and filtering circuit SEN receives a sampling signal vs of the inductor current iL of the resonance-type contactless power supply 10 in each adjustment cycle. The sampling signal vs may represent an average value of the inductor current iL in each adjustment cycle, or a value of the inductor current iL at a particular moment or in a particular time period of each adjustment cycle.

The first capacitor C1 is electrically coupled between a first output terminal of and a reference terminal. The second capacitor C2 is electrically coupled between a second output terminal o2 and the reference terminal. The first switch S1 is electrically coupled between an output terminal of the sampling signal and the first output terminal o1. The second switch S2 is electrically coupled between the first output terminal and the second output terminal o2. The first switch S1 and the second switch S2 is turned on and off alternatively.

In the (n−1) th adjustment cycle, when the first switch S1 is turned on and the second switch S2 is turned off, the first capacitor C1 is charged by the sampling signal vs from the sampling signal output terminal. Thus, the first capacitor is capable of recording and maintaining the voltage v(n−1) representing the sampling value. When the first switch S1 is turned off, the second switch is turned on. In such case, the charge is transferred from the first capacitor C1 to the second capacitor C2 through the second switch S2. Thus, the second capacitor C2 is capable of recording and maintaining the voltage v(n−1) representing the sampling value in the (n−1) th adjustment cycle.

In the (n) th adjustment cycle, when the first switch S1 is turned on and the second switch S2 is turned off again, the voltage across the first capacitor C1 is modified as a voltage v(n) representing the sampling value in the (n) th adjustment cycle, i.e. the current adjustment cycle. Meanwhile, the voltage across the second capacitor C2 maintains a voltage v(n−1) representing the sampling value in the (n−1) th adjustment cycle, i.e. the previous adjustment cycle.

Accordingly, the sampling circuit 15*a* outputs the first sampling signal v(n) at the first output terminal o1 and the second sampling signal v(n−1) at the second output terminal o2. The first sampling signal v(n) represents the sampling value in the current adjustment cycle, and the second sampling signal v(n−1) represents the sampling value in the previous adjustment cycle.

Figure 7:
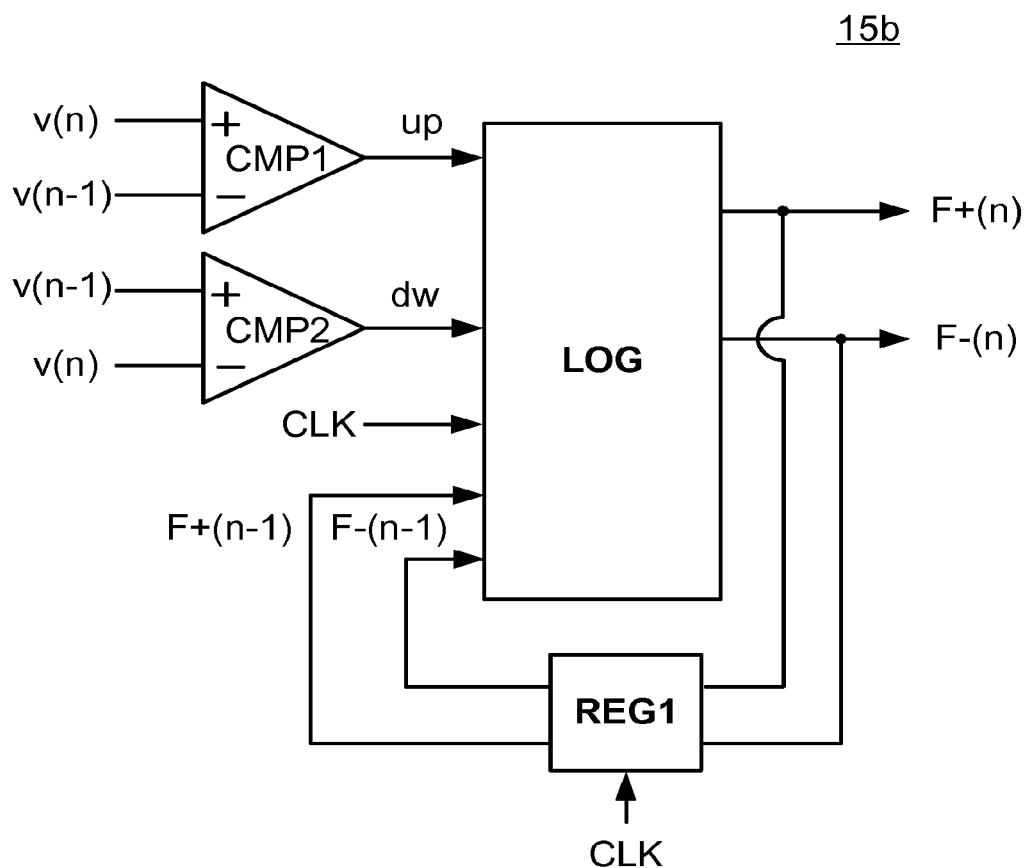
FIG. 7 is a schematic circuit diagram of an adjustment instruction circuit according to one preferable embodiment of the disclosure.

FIG. 7 is a schematic circuit diagram of an adjustment instruction circuit according to one preferable embodiment of the disclosure. As shown in FIG. 7, the adjustment instruction circuit 15*b* includes a first comparator CMP1, a second comparator CMP2, a register REG1 and an adjustment logic circuit LOG.

The first comparator compares the first sampling signal v(n) with the second sampling signal v(n−1), and provides a first instruction signal up. The first instruction signal up is valid in a case that the first sampling signal v(n) is larger than the second sampling signal v(n−1), for example, having a high level.

The second comparator CMP2 compares the second sampling signal v(n−1) with the first sampling signal v(n), and provides a second instruction signal dw. The second instruction signal dw is valid in a case that the second sampling signal v(n−1) is larger than the first sampling signal v(n), for example, having a high level.

As shown in FIG. 7, the non-inverting input terminal and the inverting input terminal of the first comparator CMP1 receive the first sampling signal v(n), and the second sampling signal v(n−1), respectively. The non-inverting input terminal and the inverting input terminal of the second comparator CMP2 receive the second sampling signal v(n−1), and the first sampling signal v(n), respectively. It is understood that the above arrangement may be changed in view of an actual level of the valid signal.

The register REG1 feeds back the adjustment signal F in the previous adjustment cycle to the adjustment logic circuit. The adjustment signal F may be a one-channel or two-channel signal, for example, including a pair of adjustment signals F+ and F−, which are complementary to each other, as shown in FIG. 7.

The clock signal CLK may be provided to the register REG1 so that the register REG1 stores data according to the adjustment cycle.

The adjustment logic circuit LOG provides an adjustment signal F which is the same as that in the previous adjustment cycle when both the first instruction signal up and second instruction signal dw indicate that the first sampling signal v(n) is larger than the second sampling signal v(n−1), that is, the inductor current in the current adjustment cycle is larger than the one in the previous cycle. The adjustment logic circuit LOG provides an adjustment signal F which is opposite to that in the previous adjustment cycle when both the first instruction signal up and the second instruction signal dw indicate the first sampling signal v(n) is less than the second sampling signal v(n−1), that is, the inductor current in the current adjustment cycle is less than that in the previous cycle.

The clock signal CLK is also provided to the adjustment logic circuit LOG so that the adjustment logic circuit LOG outputs the adjustment signal F according to the adjustment cycle.

Figure 8:
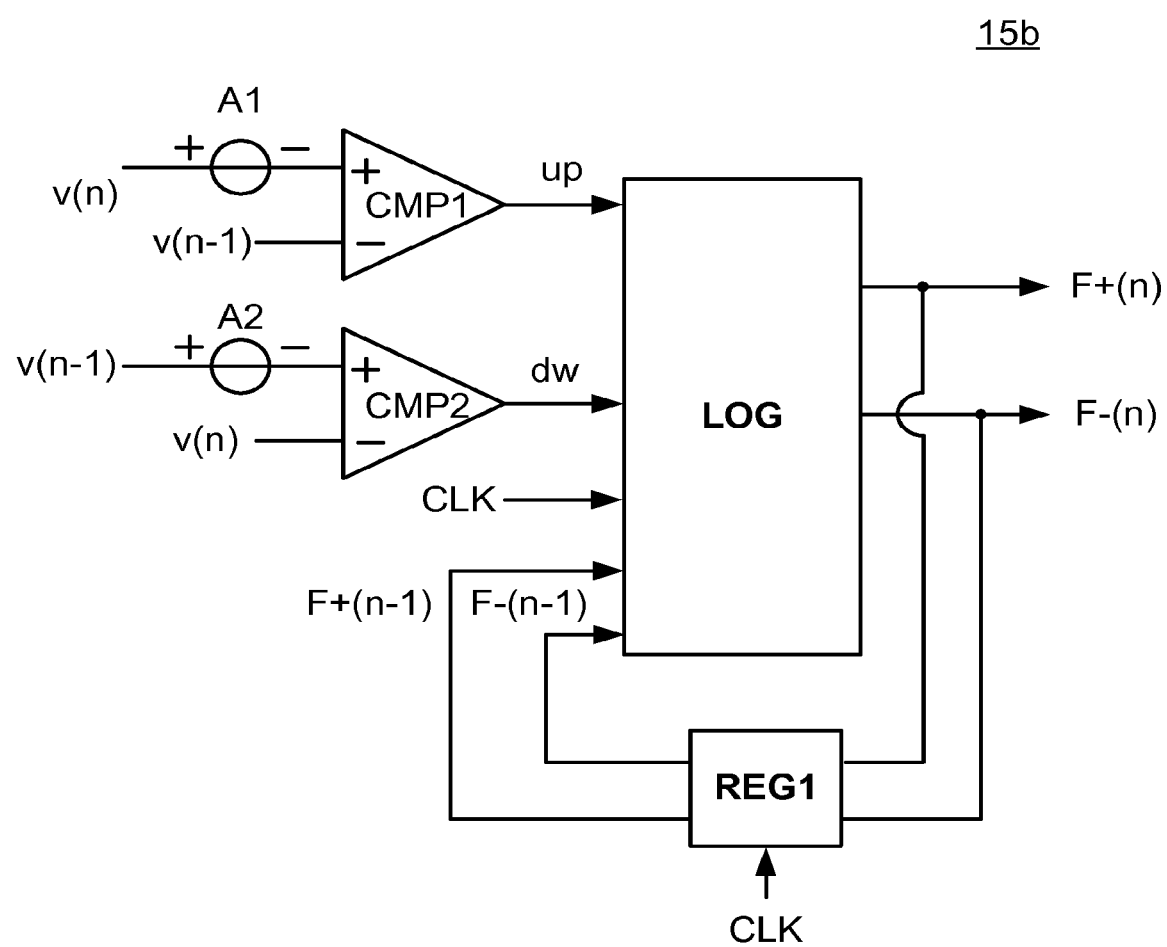
FIG. 8 is a schematic circuit diagram of an adjustment instruction circuit according to another preferable embodiment of the disclosure.

FIG. 8 is a schematic circuit diagram of an adjustment instruction circuit according to another preferable embodiment of the disclosure. As shown in FIG. 8, the adjustment instruction circuit 15*b* includes the first comparator CMP1, the second comparator CMP2, the register REG1 and the adjustment logic circuit LOG. Moreover, the adjustment instruction circuit 15*b* further includes a first voltage source A1 and a second voltage source A2, which are configured to compensate offset voltages of the first comparator CMP1 and the second comparator CMP2.

The first voltage source A1 is connected to the non-inverting input terminal of the first comparator, and compensates the offset voltage of the first comparator. The second voltage source A2 is connected to the non-inverting input terminal of the second comparator, and compensates the offset voltage of the second comparator. As shown in FIG. 8, the first voltage source A1 and the second voltage A2 receive the first sampling signal v(n) and the second sampling signal v(n−1) at the terminals which are not connected to the first comparator CMP1 and the second comparator CMP2, respectively.

As shown in FIG. 8, the first voltage source A1 provides the first sampling signal v(n) minus a predefined value to the first comparator CMP1. The second voltage source A2 provides the second sampling signal v(n−1) minus a predefined value to the second comparator CMP2. It is understood that voltage levels and polarities of the first voltage source A1 and the second voltage source A2 can be changed according to an actual operation to compensate the offset voltage.

The voltage sources are used for avoiding inconsistence between the instruction signals from the first comparator CMP1 and from the second comparator CMP2 due to occurrence of offset voltage. For example, both the first instruction signal up and the second instruction signal dw are valid.

As shown in FIG. 5, in a preferable embodiment, the control signal adjusting circuit 15c includes an up-down counter CNT, a digital-to-analog converter DAC, a voltage controlled oscillator VCO and an inverter control circuit CRL.

The up-down counter CNT receives the adjustment signal F, and provides a counter value fn by counting up or counting down. The up-down counter CNT can be set to have an initial value, and has an upper limit and a lower limit of the counter value, so as to define a frequency range of the control signal.

The digital-to-analog converter DAC converts the counter value fn to an analog signal fn', and controls the voltage controlled oscillator VCO to output a frequency signal $v_f$ corresponding to the analog signal fn'.

The inverter control circuit CRL generates a control signal Q of the inverter circuit in accordance with the frequency signal $v_f$.

In this embodiment, the resonance-type contactless power supply has the characteristic that an inductor current has a maximum value when it operates at a resonance frequency (i.e. a self-inductance resonance frequency or a leakage-inductance resonance frequency). Sampling values of the inductor current in two successive cycles are compared with each other. A frequency of an inverting circuit is adjusted in a manner the same as that in a previous cycle in a case that the inductor current increases, and is adjusted in a manner opposite to that in the previous cycle in a case that the inductor current decreases. Thus, the resonance-type contactless power supply can be properly tuned without the need for zero-crossing detection. The tuning circuit according to this embodiment can be used in a self-inductance resonant manner or in a leakage-inductance resonant manner, and has low circuit cost and high accuracy in tuning.

Figure 9:
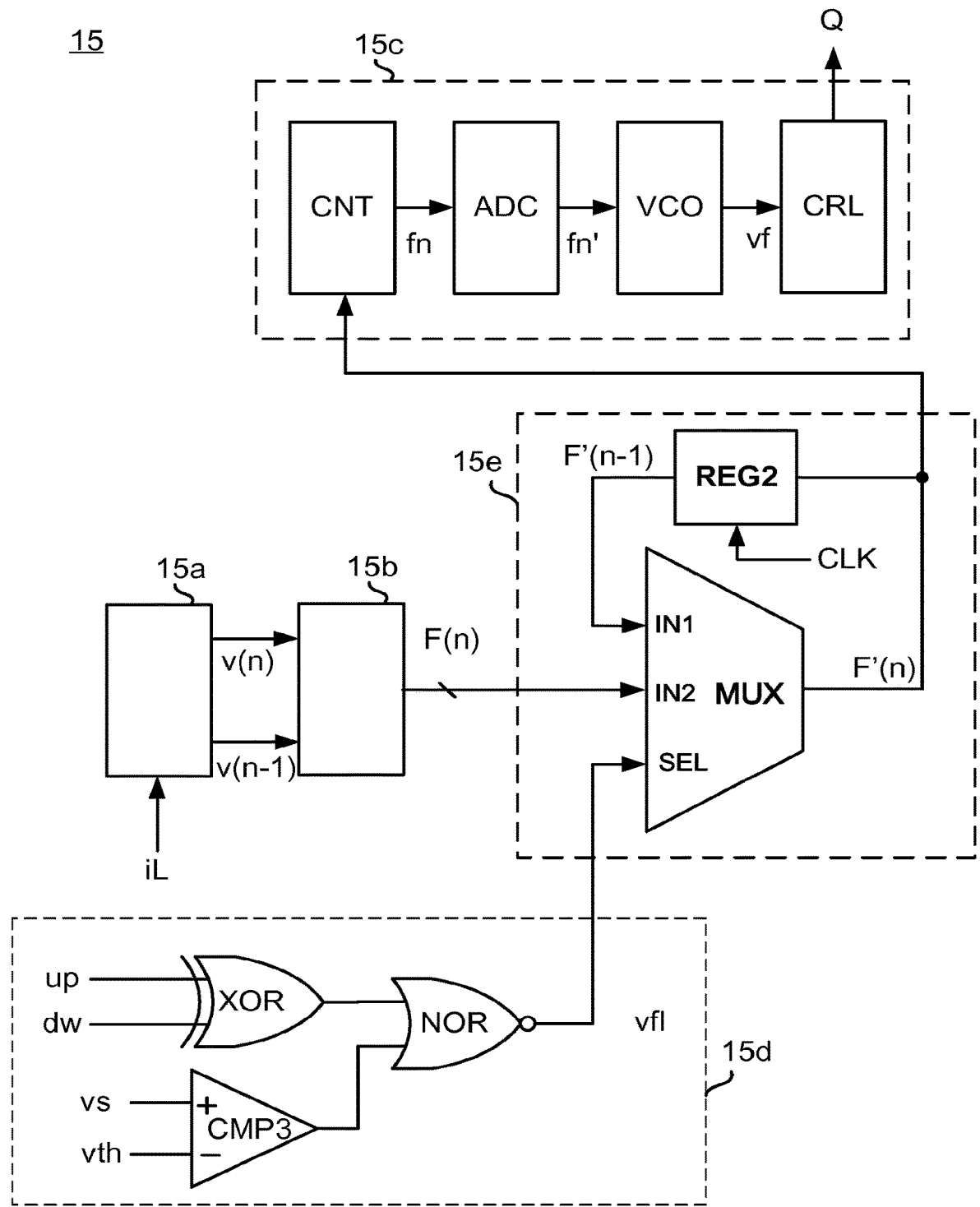
FIG. 9 is a schematic circuit diagram of an example tuning circuit according to another embodiment of the present disclosure.

FIG. 9 is a schematic circuit diagram of an example tuning circuit according to another embodiment of the present disclosure. As shown in FIG. 9, the tuning circuit 15 according to this embodiment includes a sampling circuit 15a, an adjustment instruction circuit 15b and a control signal adjusting circuit 15c. The sampling circuit 15a, the adjustment instruction circuit 15b and the control-signal instruction circuit 15c have the same functions with the ones in the previous embodiment and will not be described in detail hereinbelow.

When the frequency of the current frequency control signal is far away from the resonance frequency, the inductor current is relatively small and the variation of the inductor current in the adjacent cycles is also small. In that case, the adjustment instruction circuit 15b may not achieve a correct adjustment manner due to variations in the circuit or due to parameter errors.

To solve the above problem, the tuning circuit 15 according to this embodiment further includes a follower logic circuit 15d and a follower control circuit 15e.

The follower logic circuit 15d is used to output a follower signal $v_{fl}$ which is valid when the first instruction signal up is inconsistent with the second instruction signal dw and the sampling signal vs is less than a predefined value $v_{th}$.

In this embodiment, the inconsistence between the first instruction signal up and the second instruction signal dw implies that both the first instruction signal up and the second instruction signal dw are valid or invalid. When both the first instruction signal up and the second instruction signal are valid, the first instruction signal up indicates the first sampling signal v(n) is larger than the second sampling signal v(n−1) and the second instruction signal dw indicates the second sampling signal v(n−1) is larger than the first sampling signal v(n), which means that the first instruction signal and the second instruction are inconsistent with each other. Similarly, the first instruction signal up and the second instruction dw are inconsistent with each other when they are both invalid.

The tuning circuit cannot determine an adjustment manner because of the inconsistence between the first instruction signal and the second instruction signal. Accordingly, the follower signal from the follower logic circuit 15d is required for providing the adjustment manner.

The follower control circuit 15e is electrically coupled between the adjustment instruction circuit 15b and the control signal adjusting circuit 15c. The follower control circuit 15e receives the adjustment signal F(n) of the current adjustment cycle which is provided by the adjustment instruction circuit 15b, then provides an adjustment signal the same as that in the previous cycle or a predefined adjustment signal to the control signal adjusting circuit 15c, if the follower signal $v_{fl}$ is a valid. In other cases, the follower control circuit 15e provides the current adjustment signal.

If the follower signal $v_{fl}$ is valid, it means inductor currents of the adjacent cycles have a small difference, and the current frequency is far away from the resonance frequency. The follower control circuit 15e can continue to adjust the frequency in the previous adjustment manner, until the follower signal $v_{fl}$ becomes invalid. In another embodiment, the follower control circuit 15e may also provide a predefined adjustment signal, continue to adjust the frequency in the previous adjustment manner, until the follower signal $v_{fl}$ becomes invalid. As described above, the tuning circuit 10 may set an initial frequency f0 and an initial adjustment signal F', and the predefined adjustment signal can be set in accordance with the initial adjustment signal.

Preferably, the follower logic circuit 15d may be implemented as the logic circuit described in the FIG. 9, including an XOR gate, a third comparator CMP3 and a NOR gate.

The XOR gate receives the first instruction signal up and the second instruction signal dw, and provides a low level when both the first instruction signal up and the second instruction signal dw have a high level or a low level.

The third comparator CMP3 compares the sampling signal vs and the predefined threshold $v_{th}$, and has a low level when the sampling signal vs is less than the predefined threshold $v_{th}$.

If the sampling value is relatively small, it means that the current frequency is far away from the resonance frequency.

The NOR gate has a high level when both the XOR gate and the third comparator CMP3 has a low level, so that the follower signal $v_{fl}$ is valid.

In another preferable embodiment, the follower control circuit 15e includes a multiple-channel selection circuit MUX and a register REG2. The register REG2 feeds back the adjustment signal F'(n−1) of the previous adjustment cycle from the multiple-channel selection circuit MUX to a first input terminal IN1 of the circuit MUX. The multiple-channel selection circuit MUX receives the adjustment signal F(n) of the current cycle at other one or two input terminals IN2.

The multiple-channel selection circuit MUX receives the follower signal $v_{fl}$ at the selection terminal SEL.

The multiple-channel selection circuit MUX provides the adjustment signal F'(n−1) of the previous cycle, which is fed back, when the follower signal $v_{fl}$ is valid, that is, F'(n)=F'(n−1), and provides the adjustment signal F(n) of the current cycle, which is from the adjustment instruction circuit 15b, when the follower signal vfl is invalid, that is, F'(n)=F(n).

Thus, when the comparators cannot determine the difference of the inductor currents and the current frequency is far away from the resonance frequency, the tuning circuit continues adjusting the frequency of the control signal in a following manner, until the comparators can determine variation trend of the inductor currents, and thus avoid run-time errors.

Figure 10:
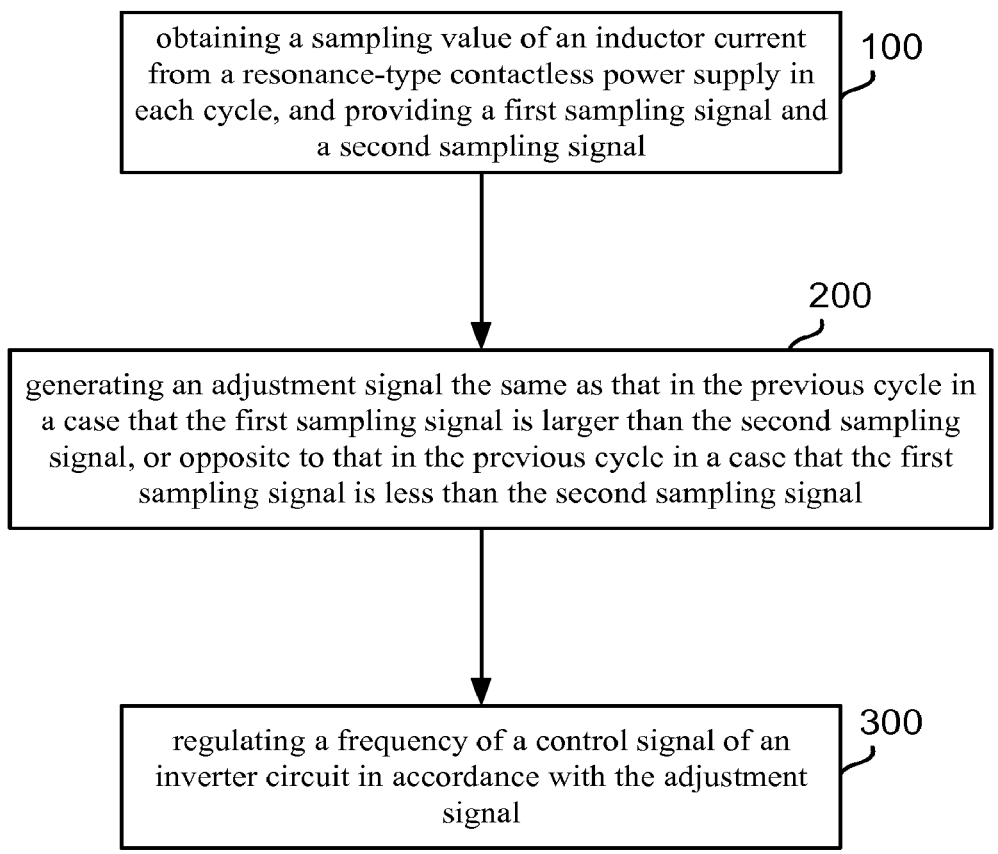
FIG. 10 is a flow chart of an example tuning method according to one embodiment of the present disclosure.

FIG. 10 is a flow chart of an example tuning method according to one embodiment of the present disclosure. As shown in FIG. 10, the method includes the following steps:

at step 100, obtaining a sampling value of an inductor current from a resonance-type contactless power supply in each cycle, and providing a first sampling signal and a second sampling signal, wherein the first sampling signal represents a sampling value in a current cycle, and the second sampling signal represents a sampling value in a previous cycle;

at step 200, generating an adjustment signal the same as that in the previous cycle in a case that the first sampling signal is larger than the second sampling signal, or opposite to that in the previous cycle in a case that the first sampling signal is less than the second sampling signal; and at step 300, regulating a frequency of a control signal of an inverter circuit in accordance with the adjustment signal.

The adjustment signal instructs the frequency of the control signal to increase or decrease by a predetermined amount.

Preferably, the first sampling signal is compared with the second sampling signal by a first comparator to provide a first instruction signal, and the second sampling signal is compared with the first sampling signal by a second comparator to provide a second instruction signal, to determine whether the first sampling signal is larger than the second sampling signal in accordance with the first instruction signal and the second instruction signal.

Preferably, a first voltage source and a second voltage source are provided to compensate offset voltages of the first comparator and the second comparator respectively.

Preferably, the Method Further Comprising:

providing a predetermined adjustment signal or an adjustment signal the same as that in the previous cycle in a case that the first instruction signal is inconsistent with the second instruction signal and the sampling value is less than a predefined threshold, and providing an adjustment signal in the current cycle in a case that the first instruction signal is consistent with the second instruction signal or the sampling value is not less than the predefined threshold.

In this embodiment, the resonance-type contactless power supply has the characteristic that an inductor current has a maximum value when it operates at a resonance frequency (i.e. a self-inductance resonance frequency or a leakage-inductance resonance frequency). Sampling values of the inductor current in two successive cycles are compared with each other. A frequency of an inverting circuit is adjusted in a manner the same as that in a previous cycle in a case that the inductor current increases, and is adjusted in a manner opposite to that in the previous cycle in a case that the inductor current decreases. Thus, the resonance-type contactless power supply can be properly tuned without the need for zero-crossing detection. The tuning method according to this embodiment can be used in a self-inductance resonant manner or in a leakage-inductance resonant manner, and has low circuit cost and high accuracy in tuning.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

What is claimed is:

1. A tuning circuit, comprising:
    a sampling circuit that is coupled to a resonance-type contactless power supply, wherein the sampling circuit obtains a sampling value of an inductor current from said resonance-type contactless power supply in each adjustment cycle, and to provide a first sampling signal and a second sampling signal, wherein said first sampling signal represents a sampling value in a current adjustment cycle, and said second sampling signal represents a sampling value in a previous adjustment cycle;
    a control signal adjusting circuit that regulates by increasing or decreasing a frequency of a control signal of an inverter circuit of said resonance-type contactless power supply in said current adjustment cycle to be in a same increasing or decreasing direction as that in said previous adjustment cycle according to an adjustment signal when said first sampling signal is greater than said second sampling signal, and that regulates said frequency of said control signal in said current adjustment cycle in an opposite increasing or decreasing direction as that in said previous adjustment cycle according to said adjustment signal when said first sampling signal is less than said second sampling signal;
    an adjustment instruction circuit configured to generate said adjustment signal that characterizes an adjustment direction; and
    a follower control circuit coupled between said adjustment instruction circuit and said control signal adjusting circuit, and being configured to provide said adjustment direction during abnormal operation of said adjustment instruction circuit.

2. The tuning circuit according to claim 1, wherein:
when said first sampling signal is greater than said second sampling signal, the state of said adjustment signal is maintained; and
when said first sampling signal is less than said second sampling signal, the state of said adjustment signal is inverted.

3. The tuning circuit according to claim 2, wherein said adjustment instruction circuit comprises:
a first comparator configured to compare said first sampling signal with said second sampling signal, and to provide a first instruction signal;
a second comparator configured to compare said second sampling signal with said first sampling signal, and to provide a second instruction signal;
a register configured to feed back said adjustment signal of said previous adjustment cycle; and
an adjustment logic circuit configured to provide said adjustment signal the same as that in said previous adjustment cycle in a case that said first instruction signal and said second instruction signal indicate that said first sampling signal is larger than said second one, or opposite to that in said previous adjustment cycle in a case that said first instruction signal and said second instruction signal indicate that said first sampling signal is less than said second sampling signal.

4. The tuning circuit according to claim 3, wherein said adjustment instruction circuit further comprises:
a first voltage source being electrically coupled to a non-inverting input terminal of said first comparator, and configured to compensate an offset voltage of said first comparator; and
a second voltage source being electrically coupled to said non-inverting input terminal of said second comparator, and configured to compensate an offset voltage of said second comparator.

5. The tuning circuit according to claim 3, further comprising:
a follower logic circuit configured to provide a follower signal which is valid in a case that said first instruction signal is inconsistent with said second instruction signal and said sampling value is less than a predefined threshold; and
wherein said follower control circuit is configured to provide a predefined adjustment signal or said adjustment signal the same as that in said previous adjustment cycle when said follower signal is valid, and to provide said adjustment signal of said current adjustment cycle when said follower signal is not valid.

6. The tuning circuit according to claim 1, wherein a change in said frequency of said control signal is proportional to a difference between said first and second sampling signals.

7. The tuning circuit according to claim 1, wherein said sampling circuit comprises:
a sampling and filtering circuit configured to obtain said sampling value of said inductor current from said resonance-type contactless power supply in each adjustment cycle;
a first capacitor being electrically coupled between a first output terminal and a reference terminal;
a second capacitor being electrically coupled between a second output terminal and said reference terminal;
a first switch being electrically coupled between an output terminal of said sampling value and said first output terminal; and
a second switch being electrically coupled between said first output terminal and said second output terminal, wherein said first switch and said second switch is turned on and off alternatively.

8. The tuning circuit according to claim 1, wherein said control signal adjusting circuit comprises:
an up-down counter configured to count up or down a counter value in accordance with an adjustment signal;
a digital-to-analog converter configured to convert said counter value to a corresponding analog signal;
a voltage controlled oscillator configured to provide a frequency signal corresponding to said analog signal; and
an inverter control circuit configured to generate a control signal of said inverter circuit in accordance with said frequency signal.

9. An apparatus, comprising:
said tuning circuit according to claim 1;
an inverter circuit configured to provide a high-frequency AC current in accordance with said control signal provided by said tuning circuit, wherein said high-frequency AC current has a frequency corresponding to said control signal;
a transmitter-side resonant circuit comprising a transmitting coil and configured to receive said high-frequency AC current from a high-frequency AC power supply; and
a receiver-side resonant circuit comprising a receiving coil which is separated from but coupled to said transmitting coil in a contactless manner, and configured to receive electric energy from said transmitting coil.

10. A tuning method, comprising:
obtaining, by a sampling circuit that is coupled to a resonance-type contactless power supply, a sampling value of an inductor current of said resonance-type contactless power supply in each adjustment cycle, and providing a first sampling signal and a second sampling signal, wherein said first sampling signal represents a sampling value in a current adjustment cycle, and said second sampling signal represents a sampling value in a previous adjustment cycle;
regulating by increasing or decreasing a frequency of a control signal of an inverter circuit in said current adjustment cycle to be in a same increasing or decreasing direction as that in said previous adjustment cycle when said first sampling signal is greater than said second sampling signal, and regulating said frequency of said control signal in said current adjustment cycle in an opposite increasing or decreasing direction as that in said previous adjustment cycle when said first sampling signal is less than said second sampling signal; and
comparing said first sampling signal against said second sampling si ng by a first comparator to provide a first instruction signal, and comparing said second sampling signal against said first sampling signal by a second comparator to provide a second instruction signal, in order to determine whether said first sampling signal is larger than said second sampling signal in accordance with said first and second instruction signals.

11. The tuning method according to claim 10, wherein a first voltage source and a second voltage source are provided to compensate offset voltages of said first comparator and said second comparator respectively.

12. The tuning method according to claim 11, further comprising:
    providing a predetermined adjustment signal or an adjustment signal the same as that in said previous adjustment cycle in a case that said first instruction signal is inconsistent with said second instruction signal and said sampling value is less than a predefined threshold, and providing said adjustment signal in said current adjustment cycle in a case that said first instruction signal is consistent with said second instruction signal or said sampling value is not less than said predefined threshold.

13. The tuning method according to claim 10, further comprising:
    generating an adjustment signal to control said frequency of said control signal;
    wherein when said first sampling signal is greater than said second sampling signal, the state of said adjustment signal is maintained; and
    wherein when said first sampling signal is less than said second sampling signal, the state of said adjustment signal is inverted.

14. The tuning method according to claim 10, wherein a change in said frequency of said control signal is proportional to a difference between said first and second sampling signals.

* * * * *